US005566716A

United States Patent [19]

Togashi et al.

[11] Patent Number: 5,566,716

[45] Date of Patent: Oct. 22, 1996

[54] HYDRAULIC CONTROL VALVE

[75] Inventors: Yoshio Togashi; Kenji Nakamura, both of Kobe; Hiroshi Iwata, Kakogawa; Michisada Sakamoto, Akashi; Yutaka Yasuhara, Kobe, all of Japan

[73] Assignee: Kawasaki Jukogyo Kabushiki Kaisha, Hyogo, Japan

[21] Appl. No.: 456,964

[22] Filed: Jun. 1, 1995

[30] Foreign Application Priority Data

Nov. 10, 1994 [JP] Japan .................................... 6-276720

[51] Int. Cl.$^{6}$ ............................ F15B 13/02; F16K 31/62

[52] U.S. Cl. .................................... 137/636.1; 137/596.1; 251/51; 251/295

[58] Field of Search ................................ 137/354, 596.1, 137/636.1, 636.2; 251/51, 295

[56] References Cited

U.S. PATENT DOCUMENTS 5,251,660 10/1993 Hori .................................... 137/636.1

FOREIGN PATENT DOCUMENTS 61-294281 12/1986 Japan .

4-93501 8/1992 Japan .

*Primary Examiner*—Gerald A. Michalsky

*Attorney, Agent, or Firm*—Marshall, O'Toole, Gerstein, Murray & Borun

[57] ABSTRACT

A hydraulically operated control valve with a cam member that pivots toward one or the other side of the neutral position in response to an operating member. A pair of push rods each with a piston interposed between the cam member and one of a pair of spool valves. A casing is provided wherein the cam member is mounted in the casing upper portion. A pair of piston chambers, each having an oil chamber formed at the top by the piston and a damper chamber formed at the bottom by the piston, are formed in the casing lower portion. A throttle in each piston communicates fluid between the corresponding oil chamber and the damper chamber. A pair of spring chambers each contain a spool valve at the center thereof. A pair of casing partition members separate the piston chambers and the spring chambers, and are adapted so the push rods extend through the center thereof. A pair of damping springs energize the pistons in the direction of departing from the partition members. A pair of check valves included on the casing partition members enable the hydraulic oil to move from the spring chambers to the damper chambers and prevent the hydraulic oil from moving from the damper chambers to the spring chambers.

3 Claims, 5 Drawing Sheets

HYDRAULIC CONTROL VALVE

TECHNICAL FIELD

The present invention relates to a hydraulic control valve used in construction vehicles for remote control of various actuators by means of pivoting operation of an operating member such as a lever and pedal, and particularly to a damping mechanism for the prevention of mis-operation due to rolling and/or vibration.

BACKGROUND OF THE INVENTION

In a construction vehicle such as a hydraulic power shovel and crane, generally various operations are carried out through remote control of various actuators by means of a hydraulically operated pilot type control valve by an operator mounted on the vehicle. Various actuators and operating devices provided in the construction vehicle are large in size and heavy, and cause vehicle malfunctions when the operator makes an abrupt operation, making it unable to operate the vehicle normally due to substantial rolling and vibration of the vehicle body. Also rolling and vibration of the construction vehicle caused by the travel or intended operation thereof are transmitted, whether or not via the operator's hand and foot, to the hydraulic control valve causing undesirable fluctuation in the amount of operation of the hydraulic valve so that, as a result, the rolling and vibration of the construction vehicle are aggravated. Therefore, fluctuation in the amount of operation of the hydraulic valve must be made as small as possible, either when the operator operates to pivot the operating member of the hydraulically operated valve off the neutral position thereof, or when the operator operates the operating member to return it from the pivoted position to the neutral position. For this reason, hydraulically operated valves equipped with damping means have been proposed.

FIG. 5 shows a cross sectional view of a typical prior art hydraulically operated valve. This prior art hydraulic valve is disclosed in Japanese Patent Application Laid-Open Sho No. 61-294281. In this prior art valve, a pivoting member 1 is made to pivot in a pivoting direction A1 by the operation of an operating member such as a pedal or lever, thereby to engage and depress an end of a push rod 2. The push rod 2 is inserted through a damper chamber 4 formed in a casing 3, whereas a piston 2*p* is formed in an intermediate section and a sealing section 2*s* of the casing 3 is inserted through the upper portion thereof. The piston 2*p* separates the damper chamber 4 into an upper chamber 4*a* and a lower chamber 4*b*. The upper chamber 4*a* and the lower chamber 4*b* communicate with each other via damping means 5. The damping means 5 includes a throttle 5*a* and a check valve 5*b*. The lower part of the push rod 2 is fitted into a spring chamber 6 that is formed in the casing 3. Disposed in the spring chamber 6 are a return spring 6*a* that presses the push rod 2 upward and a pressure spring 6*b* that transmits the pressing force applied from the bottom face of the push rod 2 to a spool valve 7. A top portion 7*c* of the spool valve 7 is fitted into a recess 2*a* formed at the bottom of the push rod 2. The spool valve 7 has an oil passage 7*a* formed at right angles to the axis thereof and an oil passage 7*b* extending in the axial direction from the oil passage 7*a* to the bottom face of the spool valve 7, both being formed thereon. The casing 3 has a pump port 8*p*, an output port 8*o* and a tank port 8*t* installed therein. At the neutral position shown in FIG. 5, the output port 8*o* and the tank port 8*t* are in fluid communication with each other through the spool valve 7 and the pump port 8*p* is shut off.

When the pivoting member 1 is pivoted in the pivoting direction A1, the push rod 2 is pressed downward so that the spool valve 7 is pressed downward via the pressure spring 6*b*. As the oil passage 7*a* perpendicular to the axis fluidly communicates with the pump port 8*p* which is located below the tank port 8*t*, the tank port 8*t* is shut off while the pump port 8*p* and the output port 8*o* fluidly communicate with each other. At this time, because the hydraulic oil in the damper chamber 4 moves from the lower chamber 4*b* to the upper chamber 4*a* through the throttle 5*a*, a damping effect can be obtained. When the pivoting member 1 returns in a direction A2 which is reverse to the pivoting direction A1, the push rod 2 is forced to move upward by the return spring 6*a* so that the hydraulic oil in the damper chamber 4 moves from the upper chamber 4*a* through the throttle 5*a* and the check valve 5*b* into the lower chamber 4*b*. At this time, because the check valve 5*b* opens, resistance against the hydraulic oil flow is reduced and therefore no damping effect can be obtained.

In such a prior art hydraulic valve as described above, while a damping effect is obtained when the pivoting member 1 pivots from the neutral position in the arrow A1 direction, there is a problem in that a damping effect cannot be obtained when the pivoting member 1 returns from the pivoted position in the arrow A2 direction to the neutral position because the check valve 5*b* is opened at this time.

FIG. 6 shows a cross sectional view of another prior art hydraulically operated valve. This prior art hydraulic valve is disclosed in Japanese Utility Model Laid-Open No. Hei 4-93501. In this prior art hydraulic valve, a cam member 11 is forced by the operation of an operating member such as a pedal to pivot in two directions indicated by arrows B1 and B2 around an axis of a shaft 11*a* thereby to press either one of a pair of spool valves (made in integral bodies with push rods 10, 10'), not shown in the drawing, via pistons 19 or 19', auxiliary push rods 12 or 12' and push rods 10 or 10' while another one is returned. On both sides of the shaft 11*a* of the cam member 11, bolts 11*b*, 11*b*' are fixed by means of nuts 11*c*, 11*c*', respectively. Heads of the bolts 11*b*, 11*b*' make contact with the pistons 19, 19', each piston having a cross section of inverted U shape. The pistons 19, 19' have oil chambers 19*a*, 19*a*' opening downward formed therein. Hydraulic oil contained in spring chambers 16, 16' under a drain pressure is introduced into the oil chambers 19*a*, 19*a*' via grooves 19*b*, 19*b*' holes 19*c*, 19*c*' recesses 19*d*, 19*d*' and holes 19*e*, 19*e*'.

A casing 13 is fixed by means of a bracket 13*f* onto a floor surface or the like of an operator's cabin wherein the hydraulic operated valve is installed. Installed in the damper chambers 14, 14' are damping springs 14*s*, 14*s*'. Installed at the bottom of cylinders 13*p*, 13*p*' are throttles 15*a*, 15*a*' and check valves 15*b*, 15*b*', to facilitate fluid communication between the damper chambers 14, 14' and the spring chambers 16, 16'. Installed in the spring chambers 16, 16' are return springs 16*a*, 16*a*' that press spring receiving pieces 17, 17' upward and pressure springs 16*b*, 16*b*' that press the spool valves (not shown in the drawing) downward during operation, with the top ends of the springs 16*a*, 16*a*', 16*b*, 16*b*' being in contact with the spring receiving pieces 17, 17'. Penetrating through central portions of the spring receiving pieces 17, 17' are push rods 10, 10' with heads 101*a*, 101*a*' thereof being fitted in recesses 19*d*, 19*d*' of the auxiliary push rods 12, 12'. A bellows 20 is installed across the cam member 11 and the bracket 13*f*, thereby to protect the inner mechanism of the hydraulic valve.

When the operator operates the operating member to cause the cam member 11 to pivot off the neutral position in the arrow B1 direction, one bolt 11*b* on the pivoting direction B1 side forces the piston 19 downward with the auxiliary push rod 12 that is in contact with the piston 19 being pressed downward at the same time, so that the spring receiving piece 17 is displaced downward and the pressure spring 16*b* presses one spool valve downward. At this time, hydraulic oil in the damper chamber 14 is made to flow via the throttle 15*a* and the groove 19*b* into the spring chamber 16 by the downward movement of the piston 19. Resistance against the hydraulic oil flow is generated by the throttle 15*a* as described above, making it possible to obtain a damping effect during pivoting from the neutral position to the arrow B1 direction.

On the other hand, the pivoting movement of the cam member 11 in the arrow B1 direction causes another bolt 11*b*' to move upward so that the piston 19' is forced to move upward by the damping spring 14*s*' and, as the inner volume of the damper chamber 14' increases, the hydraulic oil flows from the spring chamber 16 through the check valve 15*b*' to supplement the pressure in the damper chamber 14' while the oil chamber 19*a*' in the piston 19' communicates with the spring chamber 16 through the groove 19*b*', the hole 19*c*', the recess 19*d*' and the hole 19*e*', thereby to be filled with the hydraulic fluid under the drain pressure. Thus the piston 19' is always kept in contact with the bolt 11*b*'.

When the operator releases the operating member such as a pedal from the pressed state under such a condition as described above, the state of pressing the cam member 11 off the neutral position in the arrow B1 direction is canceled so that the spring receiving piece 17 which has been pressed downward by the auxiliary push rod 12 moves upward by the action of the return spring 16*a*. Thus the pressure spring 16*b* is released from the compressed state to cause one of the spool valves (not shown in the drawing) to move upward and return to the neutral position. At this time, the cam member 11 pivots in the arrow B2 direction toward the neutral position and the piston 19' is pressed downward by the bolt 11*b*', so that the hydraulic oil in the damper chamber 14' is forced back through the throttle 15*a*' into the spring chamber 16.

When the cam member 11 returns from the state of being pivoted in the arrow B1 direction to the neutral position, as described above, resistant force is exerted by the throttle 15*a*' against the hydraulic oil which flows from the damper chamber 14' into the spring chamber 16 even when an external force is exerted on the cam member 11 in the arrow B2 direction, for example, due to rolling and vibration of the vehicle body, and consequently an abrupt pressure variation is generated in the damper chamber 14' making the piston 19' unable to move quickly. This makes it possible to obtain damping effect when the operator returns the operating member to the neutral position. Also when the operating member is pivoted from the neutral position in the arrow B2 direction, or when the operating member is returned from the pivoted position to the neutral position, a damping effect can be obtained similarly, thus solving the problems of the prior art hydraulic valve shown in FIG. 5.

In such a prior art hydraulic valve as shown in FIG. 6, bubbles accumulate in the damper chambers 14, 14' and cannot be easily purged to the outside environment. Because such bubbles reduce the damping effect significantly, they should be purged at an early stage. Also it is necessary to contain a high pressure generated in the damper chambers 14, 14' during damping by means of the sealing members 10*a*, 10*a*', although it is difficult to achieve high reliability because the pistons 19, 19' have large diameters and undergo a sliding motion. Further, the pistons 19, 19', the auxiliary push rods 12, 12' and the cylinders 13*p*, 13*p*' have complicated structures requiring high production costs.

In consideration of the problems in the prior art described above, it is desired to provide an improved hydraulically operated control valve of high reliability and lower cost that solves the problems described above, wherein a damping effect can be obtained both when an operating member is moved from a neutral position to a pivoted position and when the operating member is returned from the pivoted position to the neutral position.

SUMMARY OF THE INVENTION

The present invention provides a hydraulically operated control valve, wherein one of a pair of spool valves is displaced by pivoting an operating member so that a pump port and an output port which corresponds to one of the spool valves are made to communicate with each other by the spool valve, and another output port and a tank port are made to communicate with each other by the other spool valve, thereby to generate a secondary pressure which is proportional to the amount of pivoting motion of the operating member, in either one of the output ports corresponding to the pivoting operation.

The hydraulic control valve according to the invention includes a cam member that pivots toward one or the other side of the neutral position, depending on the amount and direction of operating the operating member. A pair of push rods is provided, each of which is interposed between the cam member and one of the pair of spool valves. A pair of pistons are mounted to be liquid-tight at intermediate positions of the push rods respectively. A casing is provided wherein the cam member is mounted in the casing upper portion. A pair of piston chambers, each having an oil chamber formed at the top by the piston and a damper chamber formed at the bottom by the piston, are formed in the casing lower portion. A pair of throttles fluidly communicating between the oil chambers and the damper chambers are provided and a pair of spring chambers passed therethrough by the spool valves at the center thereof are formed. A pair of casing partition members separate the piston chambers and the spring chambers, and are longitudinally passed through by the push rods at the center thereof. A pair of damping springs energize the pistons in the direction of departing from the partition members. A pair of check valves enable the hydraulic oil to move from the spring chambers to the damper chambers and prevent the hydraulic oil from moving from the damper chambers to the spring chambers.

In accordance with the invention a throttle is installed on the piston and a check valve is installed on the partition member. The present invention further provides a hydraulic valve wherein a passage is formed in the casing to fluidly communicate between the upper space of each oil chamber and the tank port.

According to the invention, a cam member is pivoted from a neutral position to one or the other side by the pivoting action of an operating member, and a pair of push rods are brought into elastic, i.e., spring-biased contact with the cam member by the spring force of damping springs. The casing has a pair of piston chambers and a pair of spring chambers each of which fluidly communicates with the corresponding one of the piston chambers, while the push rods penetrate through the corresponding piston chambers in a liquid-tight condition. The piston chamber and the spring chamber are separated by a partition member that is provided with a check valve. A piston is housed in each piston chamber, and the piston separates the piston chamber into a damper chamber and an oil chamber. Each piston has a throttle formed therein to enable fluid communication between the damper chamber and the oil chamber. Each push rod has a contact portion formed on the oil chamber side with respect to the piston. Each damper chamber has a damping spring installed therein to energize each piston in a direction of departing from the partition member.

As a result, when either of the push rods is pressed by the cam member, one of the pistons is pressed downward by the contact portion thereby to reduce the inner volume of one of the damper chambers so that the hydraulic oil contained in the damper chamber is transferred through the throttle to the oil chamber side. Because the hydraulic oil in the damper chamber moves through the throttle to the oil chamber, the moving hydraulic oil experiences a significant resistance against its flow, thereby producing a damping effect. At the same time, the other push rod is forced to move upward by the spring force of the damping spring via the piston, thereby keeping the other push rod in spring-biased contact with the cam member. During the upward motion of the other push rod, the spool valve corresponding to this push rod maintains the neutral position by the partition member, and therefore maintains the state of the tank port and the output port in fluid communication with each other. One of the spool valves displaced by one push rod on the pressured side lets the pump port and the output port fluidly communicate with each other. In this way, secondary pressure can be generated selectively in the output port of each spool valve corresponding to the pivoting direction of the operating member.

When the cam member is displaced from the neutral position to one side by the operation of the operating member thereby displacing one push rod from the neutral position to a lower pivoted position as described above, the other push rod is displaced from the neutral position to an upper pivoted position.

When the cam member returns from one pivoted position to the neutral position, one push rod is forced by one of the damper springs to move upward in contact with the cam member via the piston, while the hydraulic oil is introduced from one of the spring chambers through the check valve into one of the damper chambers thereby supplementing the pressure therein. At this time, the other push rod that has already been in contact with the cam member and forced to move up to the upper pivoting position is pressed downward by the pivoting movement of the cam member to the neutral position, while the other piston is forced to move down, too, so that the hydraulic oil in the other damper chamber moves through the other throttle to the other oil chamber, resulting in a damping effect being produced. Thus the damping effect can be obtained regardless of whichever direction the operating member is pivoted.

Also according to the invention, a pumping function can be added to the damper chamber by providing the piston with a throttle and providing the partition member with a check valve.

Further according to the invention, a passage is formed for fluidly communicating an upper space of each oil chamber and the tank port in the casing, so that bubbles in the spring chambers and in the damper chambers can be quickly led to the oil chamber at the top and bubbles accumulated in the oil chambers can be purged through the passage to the tank port. Thus a stable damping effect is obtained.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
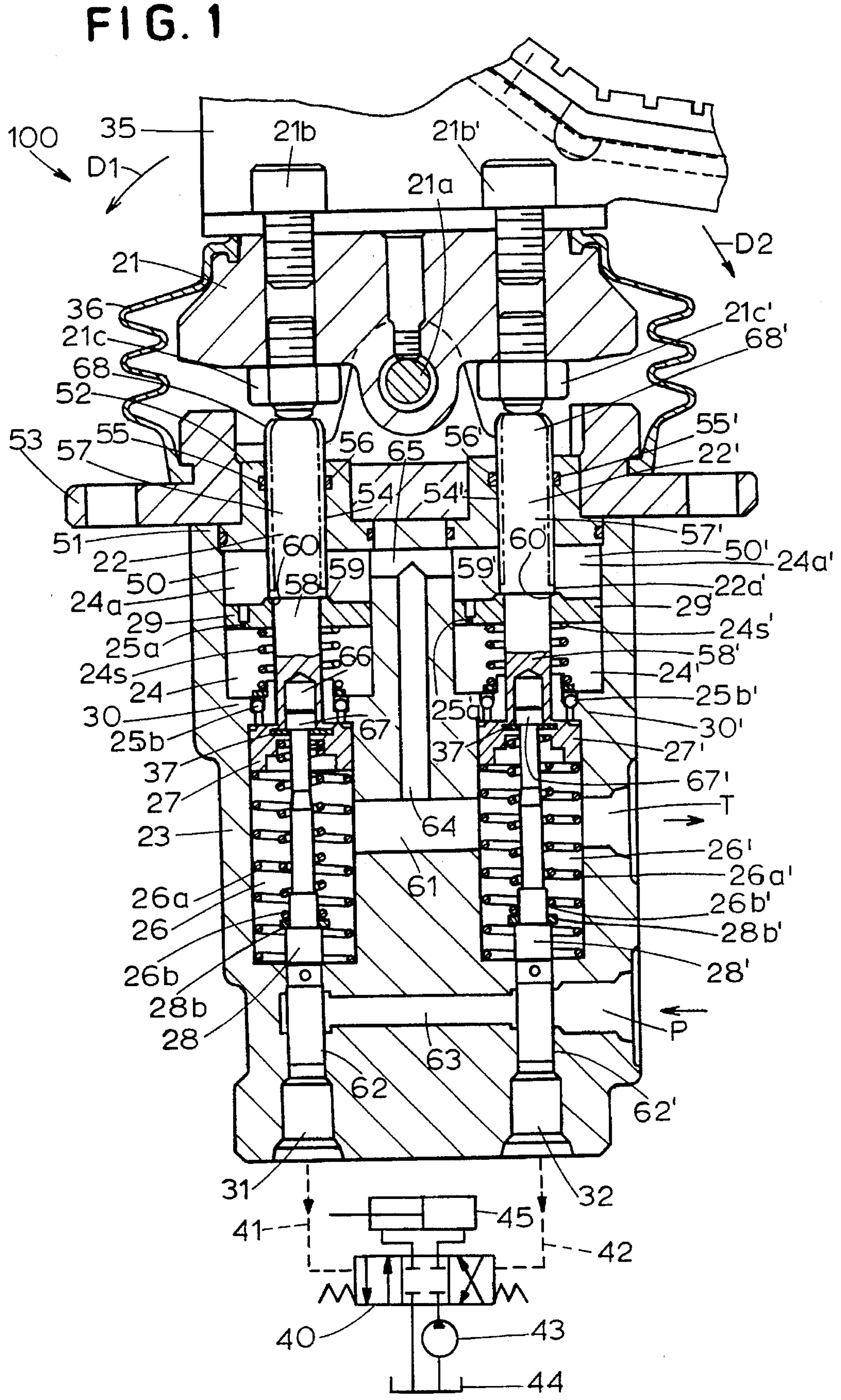
FIG. 1 is a cross sectional view of a hydraulic valve in accordance with one embodiment of the invention.

FIG. 1 is a cross sectional drawing showing the construction of a hydraulically operated control valve 100 of one embodiment of the invention. In the operator's cabin of a construction or heavy equipment vehicle, for example, a pedal 35 is installed as an operating member. By tilting or pivoting the pedal 35 to one side illustrated by the reference arrow D1 or to the other side illustrated by the reference arrow D2, a pair of spool valves 28, 28' are displaced in opposite directions to each other to enable fluid communication between a pump port P and an output port 31 (or 32) corresponding to one spool valve 28 (or 28') by means of the spool valve 28 (or 28') and enable fluid communication between the other output port 32 (or 31) and a tank port T by the other spool valve 28' (or 28), thereby generating secondary pressure in either one output port 31 (or 32) among the output ports 31, 32 that corresponds to the tilting or pivoting operation.

The hydraulic valve 100 includes a cam member 21 that tilts from a neutral position shown in FIG. 1 toward one side D1 or the other side D2 depending on the direction of operating the pedal 35 and a pair of push rods 22, 22' which make elastic or spring-biased contact with the cam member 21.

A housing or casing 23 includes a pair of piston chambers 50, 50' that are passed through by the respective push rods 22, 22' in liquid tight condition and a pair of spring chambers 26, 26' that communicate with the respective piston chambers 50, 50' are formed therein. Bulkheads 30, 30' are formed by a pair of partition members housed in the respective piston chambers 50, 50' so as to separate the piston chambers 50, 50' and the spring chambers 26, 26'.

A pair of pistons 29, 29' are penetrated by the push rods 22, 22' in the respective piston chambers 50, 50' and separate the piston chambers 50, 50' into respective damper chambers 24, 24' and oil chambers **24*a*, 24*a*', while being provided with throttles 25*a*, 25*a*' that enable fluid communication between the damper chambers 24, 24' and the oil chambers 24*a*, 24*a*'. A pair of check valves 25*b*, 25*b*' installed in the bulkheads 30, 30', respectively, enable fluid coupling of the hydraulic oil from the spring chambers 26, 26' to the damper chambers 24, 24', and prevent fluid coupling of the hydraulic oil from the damper chambers 24, 24' to the spring chambers 26, 26'**.

A pair of damping springs **24*s*, 24*s*' are provided for spring-loading the pistons 29, 29' to depart from the bulkheads 30, 30' in the respective damper chambers 24, 24'. A pair of pressure springs 26*b*, 26*b*' are housed in the respective spring chambers 26, 26' and transmit the descending displacements of the push rods 22, 22' to the respective spool valves 28, 28'. A pair of return springs 26*a*, 26*a*' are housed in the respective spring chambers 26, 26' and spring-load the push rods 22, 22', that have been pressed downward by the cam member 21**, upward by means of spring force.

The cam member 21 can tilt or pivot in the directions of arrows D1 and D2 around the axis of the shaft **21*a*, while the neutral state is as shown in FIG. 1. On both sides of the cam member 21 in the pivoting directions D1 and D2 with respect to the shaft 21*a* there is provided a pair of bolts 21*b*, 21*b*' fixed by means of nuts 21*c*, 21*c*', respectively. Tips of the bolts 21*b*, 21*b*' are in contact with the top ends of the push rods 22, 22', respectively. The return springs 26*a*, 26*a*' are interposed between the bottom faces of the spring chambers 26, 26' and the lower faces of the spring receiving pieces 27, 27'. The return springs 26*a*, 26*a*' spring-load or upwardly bias the spring receiving pieces 27, 27' under a condition of being supported on the bottom faces of the spring chambers 26, 26'. The pressure springs 26*b*, 26*b*' set inside the return springs elastically press the spool valves 28, 28' under the condition of being supported on the bottom faces of the spring receiving pieces 27, 27'** near the centers thereof.

The housing or casing 23 has a housing or casing body 51 and a lid 52 that sealably closes an opening of the casing body 51 in liquid-tight condition. Fixed on the lid 52 is a bracket 53 that supports both ends of the shaft **21*a*, while the bracket 53 is fixed on the floor or the like of the operator's cabin. The lid 52 has through holes 54, 54' where the push rods 22, 22' extend through and annular grooves 55, 55' opening toward the inner circumferential surfaces of the through holes 54, 54' being formed thereon. Fitted in the grooves 55, 55' are annular low-pressure sealing members 56, 56', respectively. These low-pressure sealing members 56, 56' make elastic or spring biased contact with outer circumferential surfaces of the respective push rods 22, 22' over the entire circumference in the circumferential direction. The low-pressure sealing members 56, 56' achieve air-tight sealing of the oil chambers 24*a*, 24*a*'** from the outer space of the surrounding environment.

The push rods 22, 22' have large diameter sections 57, 57' as contact sections that make sliding contact with the low-pressure sealing members 56, 56' and small diameter sections 58, 58', while contact faces 60, 60', whereon end faces 59, 59' of the pistons 29, 29' facing the oil chambers **24*a*, 24*a*' make contact, are formed to protrude outward in the radial direction from the small diameter sections between the large diameter sections 57, 57' and the small diameter sections 58, 58'. These contact faces 60, 60' are formed in a plane perpendicular to the axes of the push rods 22, 22'. Because the push rods 22, 22' are constructed of the large diameter sections 57, 57' and the small diameter sections 58, 58'**, as described above, they can be machined easily thereby improving the ease of productivity.

Formed at the bottom of the casing 23 are the pair of output ports 31, 32. Formed on one side of the casing 23 are a pump port P and a tank port T communicating with the spring chambers **26*a*, 26*a*'. Tilting or pivoting displacement of the cam member 21 is carried out by the equipment operator operating a pedal 35 mounted above the cam member 21. In order to allow the pivoting displacement of the cam member 21 and to protect the inner mechanism, a bellows 36 is mounted across the cam member 21 and the bracket 53**.

In the neutral condition shown in FIG. 1, the push rods 22, 22' are forced upward together with the pistons 29, 29' by the damping springs **24*s*, 24*s*', to bring the top ends thereof into contact with the end faces of the bolts 21*b*, 21*b*', thereby to prevent the displacement thereof. Bottom ends of the push rods 22, 22' are supported by the spring receiving pieces 27, 27' via split washers 37, 37'. The spring receiving pieces 27, 27' are pressed upward by the return springs 26*a*, 26*a*' with the upper ends being kept in contact with the bulkheads 30, 30'**.

The casing body 51 of the casing 23 has a first passage 61 that enables communication between the tank port T and the spring chambers 26, 26', a second passage 63 that facilitates communication between the pump port P and valve chambers 62, 62' through which the respective spool valves 28, 28' are inserted, a third passage 64 that rises from the first passage 61 upward and a fourth passage 65 that communicates with the third passage 64 at right angle and communicates with the upper space of the oil chambers **24*a*, 24*a*', being formed therein. These passages 61, 64, 65 enable the purging of bubbles consisting of gases such as air and hydraulic oil vapor from the oil chambers 24*a*, 24*a*'** to the tank port T, as the hydraulic oil flows.

Figure 2:
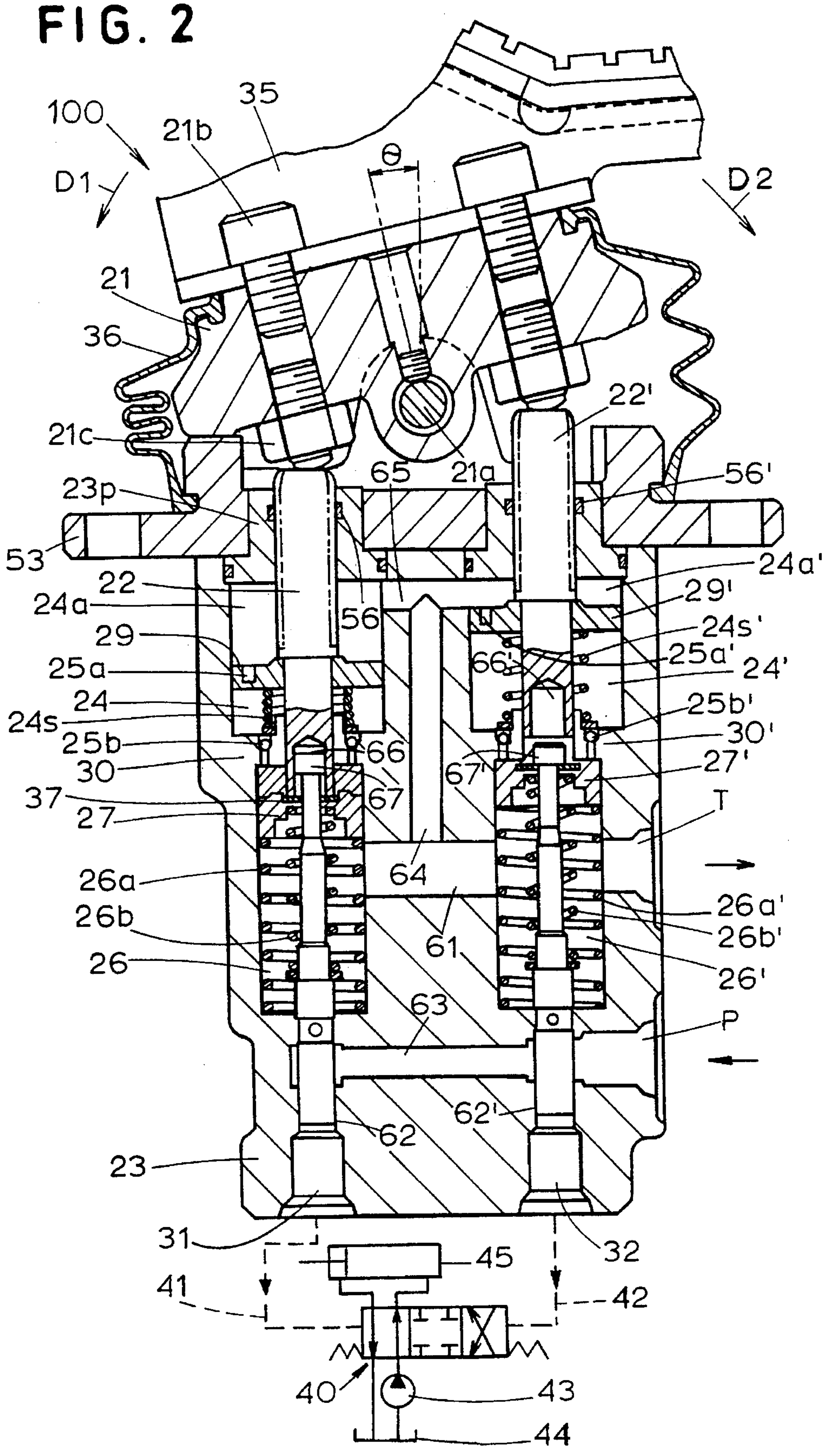
FIG. 2 is a cross sectional view of the hydraulic valve of FIG. 1 under a pivoted condition.

FIG. 2 shows the cam member 21 of the hydraulic valve 100 being tilted or pivoted to the side of one output port 31 by the equipment operator's operation of the pedal 35. The push rod 22 is pressed down on the side of one output port 31, and the push rod 22' is pressed up on the side of the other output port 32. When the push rod 22 is pressed down, the piston 29 is also pressed down by the contact surface 60 of the push rod 22, so that the hydraulic oil contained in the damper chamber 24 located between the piston 29 and the bulkheads 30 is discharged through the throttle **25*a* provided in the piston 29 to the oil chamber 24*a*** and then is discharged to the outside tank.

When the pedal 35 is operated to move from the neutral position to the pivoted position shown by the arrow D1 direction as described above, the damping effect can be obtained even when the vehicle experiences rolling and vibration, because the hydraulic oil passes through the throttle **25*a*. On the other hand, the push rod 22' and the piston 29' on the side of the other output port 32 are pressed up by the damping spring 24*s*' so that the hydraulic oil is supplied from the tank to the damper chamber 24' through the check valve 25*b*' installed on the bulkhead 30'. On the output port 31 side, the push rod 22 presses down the spool valve 28 via the washer 37, the spring receiving piece 27 and the pressure spring 26*b***, thereby generating the secondary pressure.

When the pedal 35 is operated to return from the angled pivoted position as shown in FIG. 2 to the neutral position of FIG. 1, the push rod 22 and the piston 29 on the side of the output port 31 are pressed up by the damping spring **24*s*, while the push rod 22' and the piston 29' on the side of the other output port 32 are pressed down. When the piston 29' on the output port 32 side is pressed down, the hydraulic oil is discharged through the throttle 25*a*'** to the tank, and therefore such a damping effect as described previously can be obtained.

When the pedal 35 is either pivoted from the neutral position in the arrow D1 direction as described above, or returned from the pivoted position in the arrow D2 direction to the neutral position, the hydraulic oil contained in the damper chambers 24, 24' moves through the throttles **25*a*, 25*a*' to the oil chambers 24*a*, 24*a*'. Therefore even when the operation of the pedal 35** in the arrow D1 or arrow D2 direction is abrupt or when pursuant to the action of rolling or vibration, significant flow resistance is exerted by the throttles 25*a*, 25*a*' against the hydraulic oil that flows from the damper chambers 24, 24' to the oil chambers 24*a*, 24*a*', thereby making it possible to prevent the hydraulic oil from moving quickly and to achieve a desired damping effect even when the pedal 35 is operated abruptly or the vehicle is under rolling or vibration. Also, because the oil chambers 24*a*, 24*a*' communicate with the tank port T, the sealing members 56, 56' may be of low-pressure type to achieve high liquid tightness without the need for a complicated construction using high-pressure sealing members, thereby significantly improving the reliability with regard to oil sealing and making it possible to manufacture the hydraulic operated valve at a low cost. Further, because the push rods 22, 22' are inserted through the pistons 29, 29' while the pistons 29, 29' are supported by the contact surfaces 60, 60' and the sealing members 56, 56' are brought into sliding contact with the large diameter sections 57, 57' of the push rods 22, 22' to achieve the liquid tightness, the sealing members 56, 56' may be of smaller diameters which also leads to simplification of the construction. Moreover, because the first, third and fourth passages 61, 64, 65 that communicate with the upper space of the oil chambers 24*a*, 24*a*' are formed in the casing 23 to communicate with the tank port T, accumulation of bubbles such as air and vaporized hydraulic oil in the oil chambers 24*a*, 24*a*' can be prevented thereby achieving a stable damping effect.

Figure 3:
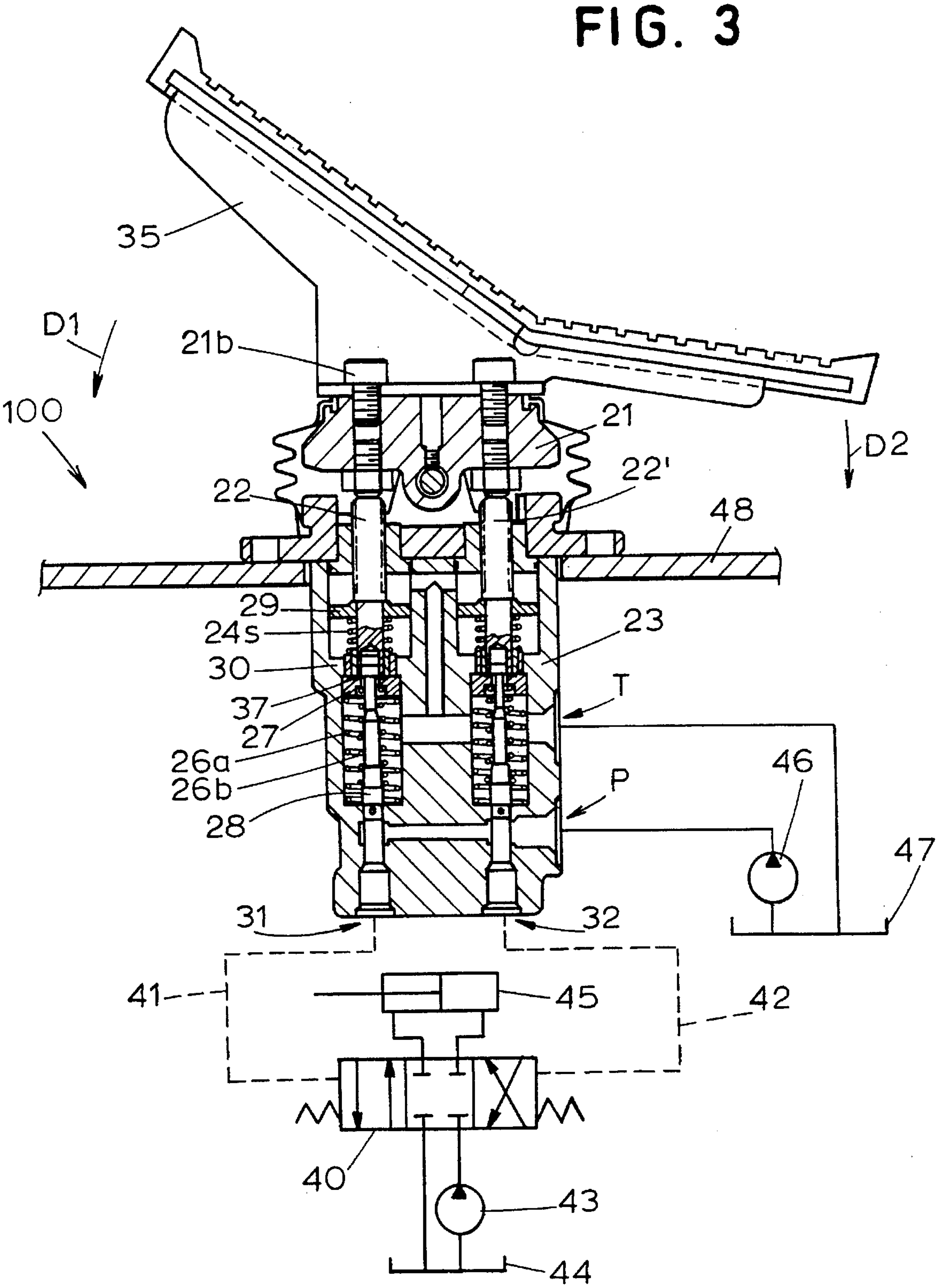
FIG. 3 is a schematic diagram of a hydraulic control device using the hydraulic valve of the embodiment shown in FIG. 1.

FIG. 3 shows a basic configuration of a hydraulic control system using the hydraulic valve 100 of the embodiment shown in FIG. 1. The output ports 31, 32 are respectively connected to pilot ducts 41, 42 of a switching valve 40, while the switching valve 40 is installed between a pump 43, a tank 44 and an actuator 45. The actuator 45 comprises a hydraulic motor that drives a crawler unit such as a construction or heavy equipment vehicle or a lifting hydraulic cylinder of a hydraulic power shovel. Connected to the pump port P is a pump 46 for the control of pilot hydraulic pressure, and the tank port T is connected to the tank 47.

Figure 4:
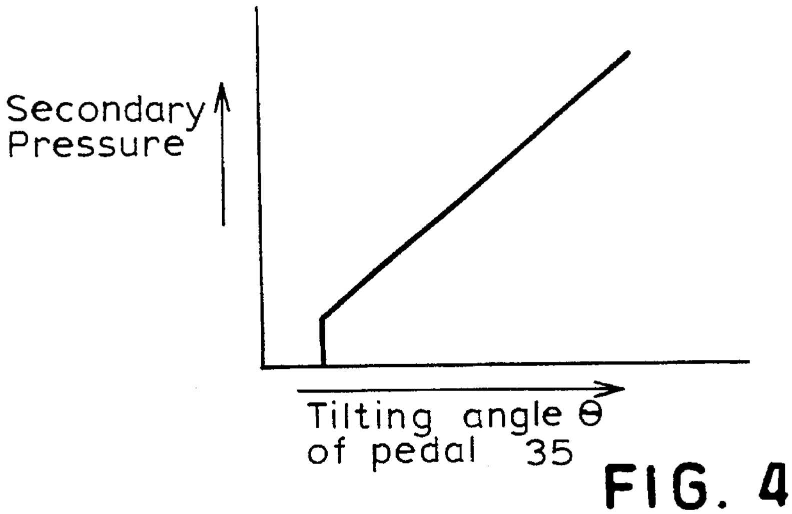
FIG. 4 is a graph showing an operating characteristic of the hydraulic valve embodiment shown in FIG. 1.
Figure 5:
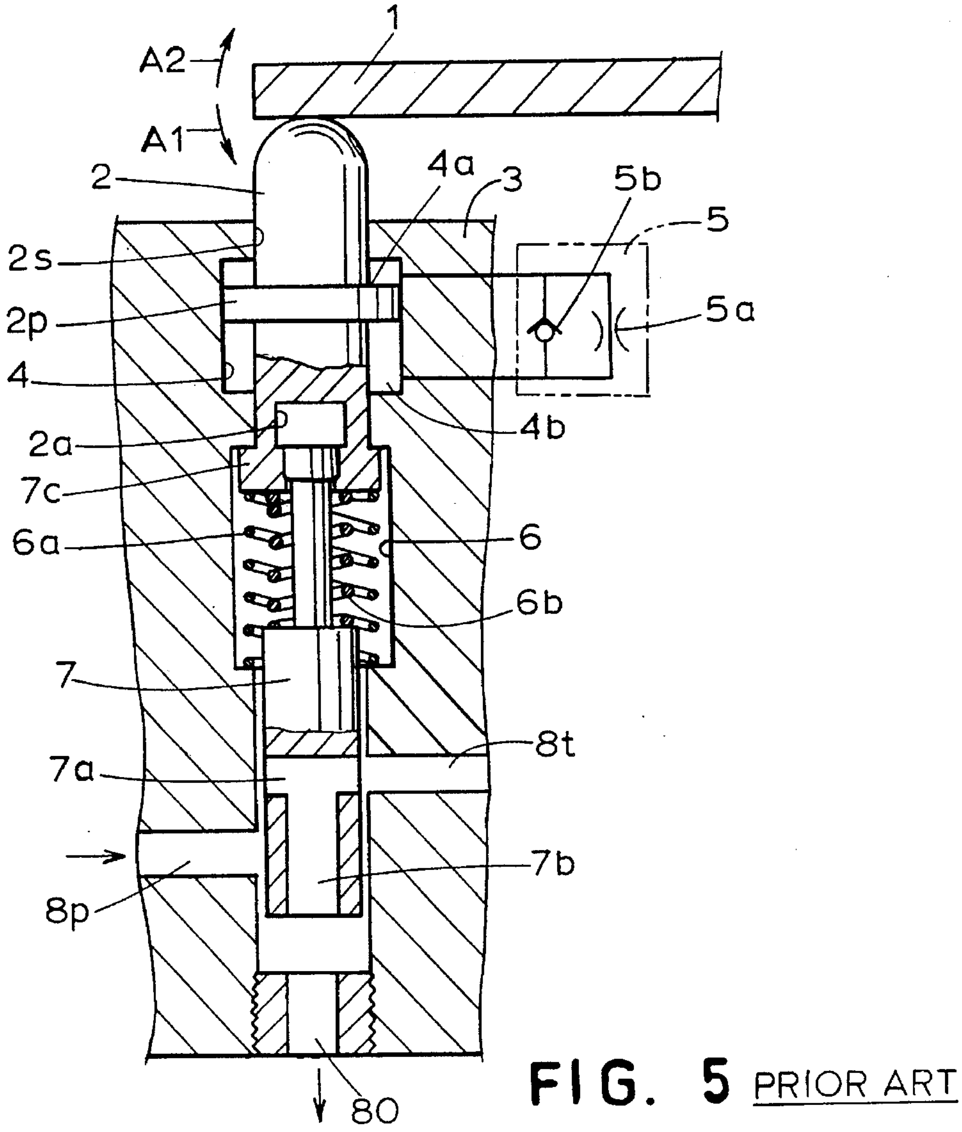
FIG. 5 PRIOR ART
FIG. 5 is a cross sectional view of a prior art hydraulic valve.
Figure 6:
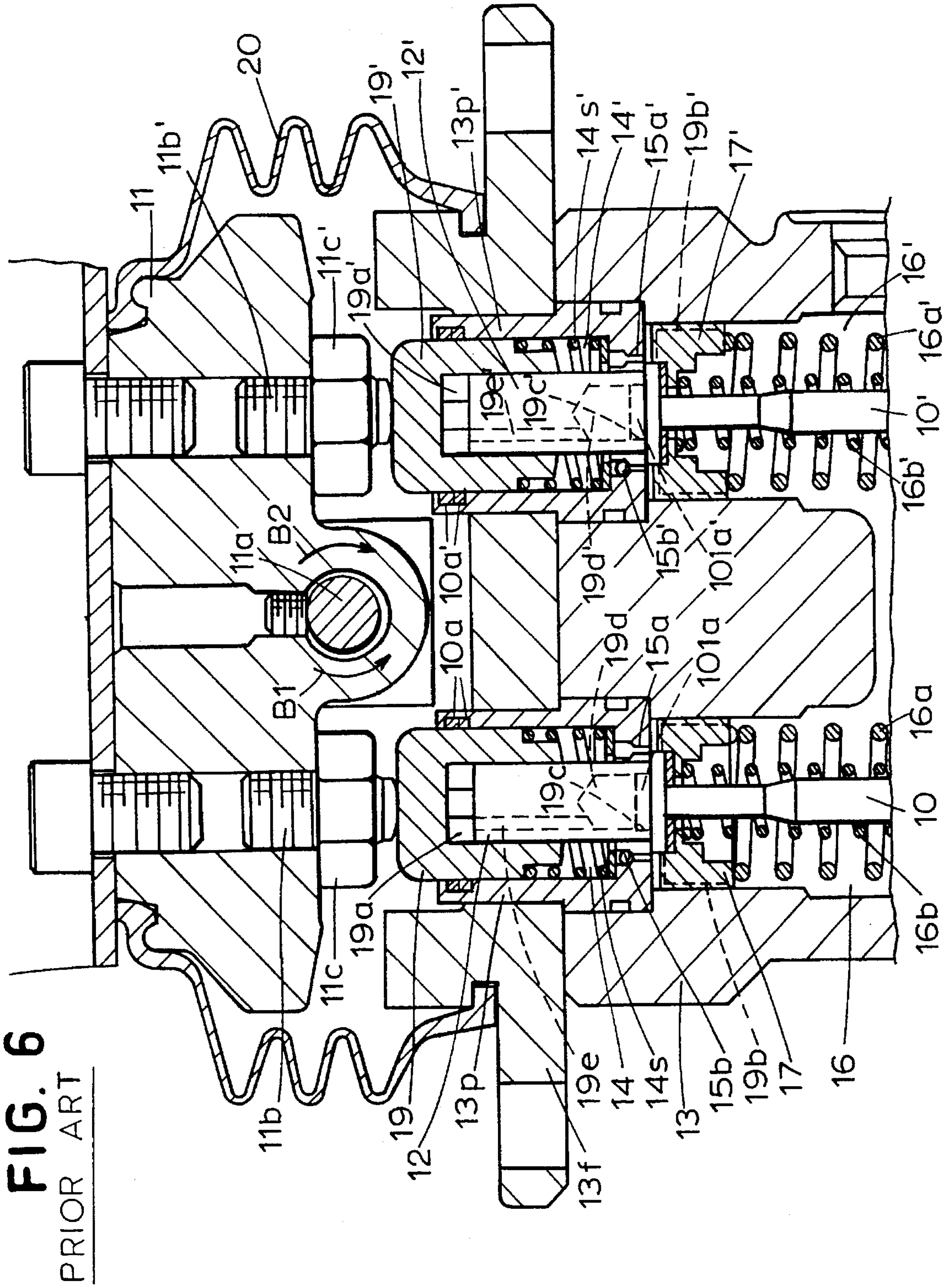
FIG. 6 PRIOR ART
FIG. 6 is a cross sectional view of another prior art hydraulic valve.

FIG. 4 shows an operating characteristic of the hydraulic valve 100 embodiment of FIG. 1. FIG. 4 shows, in conjunction with FIG. 1, that tilting or pivoting of the cam member 21 causes secondary pressure in proportion to the tilting angle to be generated in the output ports 31, 32. The push rods 22, 22' have recesses 66, 66' formed at the bottom thereof, while top portions 67, 67' of the spool valves 28, 28' are fitted into the recesses 66, 66'. The recess 66 of one push rod 22 is formed with such a depth that allows the top portion 67 of the spool valve 28 to enter therein to a certain extent as shown in FIG. 2 on the output port 31 side. The recess 66' at the bottom of the push rod 22' and the top portion 67' of the spool valve 28' are allowed to depart from each other as shown in FIG. 2 on the output port 32 side.

Although the push rods 22, 22' are constructed from the large diameter sections 57, 57' and the small diameter sections 58, 58' to form the contact surfaces 60, 60' so that the contact surfaces 60, 60' press against the pistons 29, 29' in the embodiments described above, the invention may be embodied as described below in another embodiment. In an alternative embodiment, the push rods 22, 22' are made in right cylinders as indicated by imaginary lines 68, 68' in FIG. 1, with locking projections being formed as contact pieces in arc configuration or at intervals in the circumferential direction to protrude from the periphery, thereby to press the pistons 29, 29' and prevent them from coming off.

Also the piston and the push rod may be made in an integral body as another embodiment of the invention.

According to the invention, as described above, there is provided a hydraulically operated valve wherein the operating member is tilted or pivoted to either side of a neutral position which makes it possible to obtain a damping effect when the cam member is tilted, because pistons are supported by contact surfaces formed on the push rods while the damping springs are interposed between the pistons and the partition members so that, when one push rod is pressed downward by the motion of the cam member tilting according to the operation of the operating member, the lower push rod is maintained pressed upward and the piston is pressed downward together with the other push rod that has been pressed down, thereby causing the hydraulic oil contained in the damper chamber to flow through the throttle formed in the piston into the oil chamber. When the cam member returns from the tilted position to the neutral position, the push rod that has been pressed down and the piston are pressed up by the damping spring while the other push rod that has been already in the state of being pressed up presses down the piston thereby to cause the hydraulic oil in the damper chamber to move through the throttle into the oil chamber, and therefore the damping effect can be obtained when the cam member returns from the tilted position to the neutral position, too. Also because the push rod is inserted through the piston and the push rod is brought into contact with the cam member, the oil chamber communicating with the tank port can be formed above the piston thereby to eliminate the need to provide excessively high liquid tightness between the casing and the push rods, thus resulting in a simplified construction. Further, because the piston is supported by the contact portion of the push rod under such a condition that the push rod is inserted through the piston while the damper chamber and the oil chamber are formed on either side of the piston, it is made possible to reduce the number of component parts, simplify the constitution and increase the degree of freedom in the design.

Also according to the invention, because the piston is provided with the throttle and the partition member is provided with the check valve, a pumping function can be added to the damper chamber.

Further according to the invention, because the passage for the fluid communication between the upper space of the oil chamber and the tank port is formed in the casing, any bubbles generated in the oil chamber can be purged to the external atmosphere through the passage and the tank port, thereby preventing the accumulation of bubbles in the oil chamber and achieving a desired stable damping effect.

The foregoing detailed description has been given for clearness of understanding only, and no unnecessary limitations should be understood therefrom, as modifications will be obvious to those skilled in the art.

What is claimed is:

1. A hydraulically operated control valve, wherein one of a pair of spool valves with associated respective output ports is displaced selectively by pivoting an operating member so that a pump port and an output port corresponding to said one of the spool valves communicate with each other via the spool valve, and the other output port and a tank port communicate with each other via the other spool valve, thereby to generate secondary pressure which is proportional to the amount of pivoting motion of the operating member, in either one of the output ports corresponding to the pivoting operation, comprising:

- a cam member pivotable toward one or the other side of a neutral position, in response to the amount and direction of operating the operating member;
- a pair of push rods each interposed between the cam member and one of the pair of spool valves;

a pair of pistons each respectively mounted to one of the push rods respectively in liquid tight condition;

a housing having the cam member mounted in the upper portion thereof, said housing including, a pair of piston chambers containing a respective piston and each piston chamber having an oil chamber being defined on one side of the piston and a damper chamber being defined on the opposite side of the piston;

a pair of throttles, each respective throttle enabling fluid communication between the oil chamber and the damper chamber;

a pair of spring chambers in said housing each spring chamber adapted to movably mount a respective spool valve;

a pair of partition members each respectively separating the piston chambers and the spring chambers, and adapted to movably mount the push rods;

a pair of damping springs each respectively mounted in a respective damping chamber to spring bias the respective piston in the direction to depart from the partition members; and a pair of check valves, each respective check valve selectively enabling fluid communication movement from the spring chamber to the damper chamber and preventing fluid communication movement from the damper chamber to the spring chamber.

2. The hydraulically operated valve as claimed in claim 1, wherein each said throttle is included on a respective piston and each said check valve is included on a respective partition member.

3. The hydraulic operated valve as claimed in claim 1, wherein a passage is formed in the housing to enable fluid communication between each oil chamber and the tank port.

* * * * *